(12) United States Patent
Huebner et al.

(10) Patent No.: US 10,527,141 B2
(45) Date of Patent: Jan. 7, 2020

(54) FOUR-STAGE TELESCOPIC ACTUATOR WITH A SCREW DRIVE

(71) Applicant: A. MANNESMANN MASCHINENFABRIK GMBH, Remscheid (DE)

(72) Inventors: Torsten Huebner, Solingen (DE); Wilhelm Brunner, Hilden (DE)

(73) Assignee: A. MANNESMANN MASCHINENFABRIK GMBH, Remscheid (DE)

( * ) Notice: Subject to any disclaimer, the term of this patent is extended or adjusted under 35 U.S.C. 154(b) by 158 days.

(21) Appl. No.: 15/560,388

(22) PCT Filed: Mar. 22, 2016

(86) PCT No.: PCT/DE2016/100135
§ 371 (c)(1),
(2) Date: Sep. 21, 2017

(87) PCT Pub. No.: WO2016/150434
PCT Pub. Date: Sep. 29, 2016

(65) Prior Publication Data
US 2018/0058554 A1     Mar. 1, 2018

(30) Foreign Application Priority Data
Mar. 25, 2015 (DE) .......... 10 2015 104 484

(51) Int. Cl.
*F16H 25/00*     (2006.01)
*F16H 25/20*     (2006.01)
*F16H 25/22*     (2006.01)

(52) U.S. Cl.
CPC ..... *F16H 25/2056* (2013.01); *F16H 25/2015* (2013.01); *F16H 25/2204* (2013.01);
(Continued)

(58) Field of Classification Search
CPC .. F16H 25/20; F16H 25/2056; F16H 25/2204; F16H 25/2015; H02K 7/06
See application file for complete search history.

(56) References Cited

U.S. PATENT DOCUMENTS 1,748,948 A * 3/1930 Gassen ............... F16H 25/20
                                                           414/198
2,818,743 A * 1/1958 Zatsky ............... F16H 25/04
                                                          74/1 R
(Continued)

FOREIGN PATENT DOCUMENTS

DE    3910814 C2    2/1992
DE    9209280 U1    9/1992
(Continued)

OTHER PUBLICATIONS

Office Action for Chinese Application No. 201680017495.6 dated Jan. 28, 2019; 16pp.
(Continued)

*Primary Examiner* — David M Fenstermacher
(74) *Attorney, Agent, or Firm* — Hauptman Ham, LLP

(57) ABSTRACT

A telescopic actuator having a linear movement is disclosed including a motor for applying a drive torque to a screw drive, such that a threaded spindle can be linearly extended or retracted with respect to a screw nut. The telescopic actuator includes four screw drives and extends or retracts on both sides in the axial direction, the total extension path being composed of four partial extension paths.

20 Claims, 2 Drawing Sheets

(52) U.S. Cl.
CPC .............. *F16H 2025/2081* (2013.01); *F16H 2025/2096* (2013.01)

(56) References Cited

U.S. PATENT DOCUMENTS

| | | | | |
|---|---|---|---|---|
| 3,404,580 | A * | 10/1968 | Valenti | F16H 25/2056 74/89.35 |
| 4,542,383 | A * | 9/1985 | Cusey | H01Q 1/103 343/903 |
| 4,594,824 | A * | 6/1986 | Ziegler | F21V 21/22 248/654 |
| 4,651,581 | A * | 3/1987 | Svensson | B66F 3/10 74/89.35 |
| 5,035,094 | A | 7/1991 | Legare | |
| 5,069,081 | A * | 12/1991 | Morita | F16H 25/2056 74/89.31 |
| 5,111,709 | A * | 5/1992 | Torii | B25J 18/025 74/89.35 |
| 5,218,375 | A * | 6/1993 | Hillman | E04H 12/182 343/883 |
| 6,761,387 | B2 * | 7/2004 | Sloss | B60P 1/02 296/26.05 |
| 6,880,416 | B2 * | 4/2005 | Koch | A47B 9/04 74/424.72 |
| 7,225,694 | B2 * | 6/2007 | Said | F16H 25/20 74/89.35 |
| 7,424,833 | B2 * | 9/2008 | Fich | A47B 9/04 108/147.19 |
| 9,091,334 | B2 * | 7/2015 | Kollreider | A47B 9/04 |
| 9,174,724 | B2 * | 11/2015 | Sakota | B64C 13/28 |
| 2007/0295126 | A1 * | 12/2007 | Wang | F16H 25/20 74/89.35 |
| 2008/0028878 | A1 * | 2/2008 | Wang | F16H 25/20 74/89.35 |
| 2009/0016814 | A1 | 1/2009 | Cheng | |

FOREIGN PATENT DOCUMENTS

| | | |
|---|---|---|
| DE | 10018811 B4 | 6/2011 |
| FR | 2655634 A1 | 6/1991 |
| JP | S55171746 U | 12/1980 |
| KR | 20070021633 A | 2/2007 |
| WO | 9843001 A1 | 10/1998 |

OTHER PUBLICATIONS

International Search Report in Application No. PCT/DE2016/100135, dated Sep. 19, 2016, 25 pages.

Russian Office Action and Search Report for Application No. 2017134524111(060724) dated May 22, 2018, 8pp.

Office Action for European Application No. 16717090.1 dated Dec. 20, 2018; 6pp.

Office Action for Japanese Application No. 2017-550597 dated Oct. 9, 2018; 12pp.

Office Action for Korean Application No. 10-2017-7026740 dated Sep. 10, 2018; 19pp.

Office Action for Japanese Application No. 2017-550597 dated Jan. 22, 2019; 9pp.

Office Action for Korean Application No. 10-2017-7026740 dated Apr. 5, 2019; 11pp.

* cited by examiner

FOUR-STAGE TELESCOPIC ACTUATOR WITH A SCREW DRIVE

CROSS REFERENCE TO RELATED APPLICATIONS

The present application is a National Phase of International Application Number PCT/DE2016/100135 filed Mar. 22, 2016 and claims priority benefits from German Patent Application Number 10 2015 104 484.6 filed Mar. 25, 2015.

BACKGROUND

1. Field of the Invention

The disclosure is related to an actuator and, more specifically, to a telescopic actuator for executing out a linear movement.

2. Description of the Related Art

It is known from the prior art to use actuators for linear movements of various machine parts. For example, hydraulic or pneumatic actuators in which a piston rod is extended out of or retracted into a cylinder are known from the prior art.

Moreover, electromechanical actuators in the form of spindle drives are known in which a rotation movement of a drive is converted into an axial movement by rotation of a spindle or of a nut.

Specifically when there are strict precision requirements in relation to an exact axial adjustment in connection with the rapid assumption of an axial displacement position, actuators with ball screw drives are known. The ball screw drive for this purpose has a ball screw spindle with a circumferential thread and a ball screw nut, wherein ball screw nut and ball screw spindle come into form-fit engagement with interposition of balls. If an axially fixed ball screw spindle is rotated when the nut is mounted in a rotationally fixed manner, the nut executes an axial displacement movement in relation to the ball screw spindle. The conversion of rotation movement to axial movement is dependent on the pitch of the thread. The advantage is a particularly low level of friction between ball screw nut and ball screw spindle on account of the interposition of the balls, with at the same time exact axial positionability. Moreover, ball screw drives are more or less free of wear.

Linear actuators that can be extended like a telescope with ball screw drives are also known from the prior art, for example as described in WO 98/43001 A1 or DE 92 09 280 U1.

SUMMARY

The object of the present invention is to provide a telescopic actuator having a large extension path with compact dimensions in the retracted state, and which at the same time affords the possibility of targeted and exact adjustment of each operating position during the retraction and extension process.

According to one exemplary embodiment, a telescopic actuator for executing a linear movement is disclosed, wherein a motor is provided which applies a drive torque to a ball screw drive, such that a ball screw spindle can be linearly extended or retracted with respect to a ball screw nut, and wherein the telescopic actuator has four screw drives and extends or retracts simultaneously on both sides in the axial direction, wherein the total extension path is composed of four partial extension paths.

A conventional screw drive having a threaded spindle and a screw nut can be used as the screw drive. However, it is particularly preferable to use ball screw drives and/or roller screw drives. In the case of a ball screw drive, at least one of the four screw drives is designed as a ball screw drive with ball screw spindle and ball screw nut with interposition of balls. Alternatively or in addition, at least one screw drive can be designed as a roller screw drive. In the context of the invention, combined forms of the various screw drives can also be used, such that for example a ball screw drive is used with a roller screw drive or else a ball screw drive or roller screw drive is used with a conventional screw drive.

In the following description and in the illustrative embodiment, the concept of the invention is explained with a ball screw drive. Alternatively or in addition, roller screw drives or else also conventional screw drives can be used in order to form the four-stage telescopic actuator.

In the context of the invention, it is thus possible for a telescopic actuator, which can also be designated as a linear actuator, to be designed in such a way that, in the fully extended state, it has an axial length greater than or equal to 2.5 times, particularly greater than or equal to 2.8 times, preferably greater than or equal to 2.9 times, and particularly preferably greater than or equal to 3 times the axial length in the fully retracted state. This means that, in a telescopic actuator of particularly compact configuration in the fully retracted state, there is the possibility to realize a large extension path. For example, if the telescopic actuator in the fully retracted state has an axial length of 100 cm, then it is possible in particular according to the invention to extend the telescopic actuator to a length of greater than or equal to 300 cm. The length in the extended state is limited to at most 4 times the length in the retracted state.

The total extension path is composed of the four partial extension paths of the four ball screw drives. This means that each ball screw drive has an extension path, and addition of the four extension paths gives the total extension path of the telescopic actuator. It is furthermore possible, according to the invention, to influence each partial extension path by the allocation of the pitch of the thread of ball screw spindle and ball screw nut. In particular, the coordination of all four ball screw drives relative to each other then makes it possible, in the various operating positions during the extension or retraction that a telescopic actuator has four simultaneously extensible ball screw drives. This in particular affords the advantage that the sequence of pulling out is not dependent on the friction conditions or the driving of individual stages.

To ensure that the telescopic actuator is extensible on both sides in the axial direction, the four ball screw drives are divided into pairs, such that a first pair and a second pair are obtained. The first pair then extends on one side from the telescopic actuator in the axial direction, and the second pair extends on the opposite side of the telescopic actuator, likewise in the axial direction. Upon reversal of the drive torque, a retraction movement takes place. The two screw drives of each pair preferably have opposite pitch directions. This means one screw drive is left-handed and the other screw drive of the same pair is by contrast right-handed.

Each pair of ball screw drives has in turn an inner and an outer ball screw spindle, wherein in the retracted state the respectively inner ball screw spindle is received, in particular concentrically, in the outer ball screw spindle. A first inner pair of ball screw drives is in turn arranged absolutely inside in a second outer pair of ball screw drives in the retracted state. With respect to the radial direction to the radial direction protruding from the axial direction, the respective ball screw drives are arranged stacked concentrically inside each other, wherein in the retracted state there is an at least partial stacking in the axial direction. To ensure that each pair of ball screw drives executes an extension movement or retraction movement at the same time, the thread profiles of each pair are oriented in opposite directions. A screwing-out movement of a first ball screw spindle then at the same time enforces a screwing-out movement of a second threaded spindle connected thereto in a pair, and vice versa.

The individual ball screw drives thus have a stroke division such that, in each operating stage in the extension or retraction movement, the relative position to each other and the absolute position with respect to a housing of the telescopic actuator are defined.

The motor for applying the drive torque in particular in a rotation direction is offset and parallel to the axial axis of the linear movement and transmits the torque via an auxiliary means which, for example, can be a gearwheel or also a wedge belt or a chain drive. The motor itself is in particular configured as an electric motor and can be, for example, a frequency-regulated rotation current motor, a rotation current servo motor or else a stepping motor.

Moreover, a drive wheel is arranged rotatably in the housing of the telescopic actuator. In particular, the drive wheel is mounted for conjoint axial displacement with a floating bearing having a degree of freedom of rotation. By way of the auxiliary means, the drive torque is transmitted to the drive wheel, wherein the drive wheel is coupled for conjoint rotation to sleeves that are described below. By applying energy to the motor, a torque is transmitted to the drive wheel and the telescopic actuator executes an extension movement or retraction movement.

For this purpose, a first ball screw nut of the first ball screw drive at one end of the housing is coupled to the housing for conjoint rotation therewith and for conjoint displacement in the axial direction. If the first ball screw spindle now executes a rotation movement, the ball screw spindle screws in relation out of the ball screw nut or into the latter, i.e. executes the linear movement.

At its extending end, the first ball screw spindle is in turn coupled to a second ball screw spindle nut for conjoint rotation therewith and for conjoint displacement in the axial direction. This means that the second ball screw spindle nut is movable relative to the housing but is coupled to the end of the first ball screw spindle for conjoint rotation and displacement therewith. The second ball screw spindle guided in the second ball screw spindle nut is coupled to a bearing point, to be moved by the telescopic actuator, specifically for conjoint rotation therewith and for conjoint displacement in the axial direction. The rotation movement of the second ball screw spindle nut thus ensures that the latter rotates about the second ball screw spindle, and, on account of the thread pitch, the rotation movement is converted into a linear movement of the second ball screw spindle. The coordination of the thread pitch of the first ball screw drive and of the second ball screw drive then dictates the ratio with which the first ball screw drive and the second ball screw drive are extended from/retracted into the housing and move relative to each other.

To ensure that the drive torque is transmitted to the first ball screw spindle and the latter executes a rotation movement, a first sleeve is provided which is coupled to the drive wheel for conjoint rotation therewith and for conjoint displacement in the axial direction. The first sleeve has a floating bearing with an axial degree of freedom, by which it is coupled to the first ball screw spindle. In particular, this first sleeve is designed as a spline shaft in such a way that its outer circumference has grooves in which there engage with form fit a spline hub and inwardly directed continuations that are coupled to the first ball screw spindle. In this way, the rotation movement of the sleeve is transmitted to the spline hub and in turn to the first ball screw spindle. The inwardly directed continuations can then be mounted with axial displaceability in the groove, with simultaneous transmission of the rotation movement.

The third ball screw drive and the fourth ball screw drive extend on the opposite side of the telescopic actuator. For this purpose, a third ball screw nut is coupled to the housing for conjoint rotation therewith and for conjoint displacement in the axial direction. A rotation movement of the third ball screw spindle thus leads to an extension movement or retraction movement thereof with respect to the third ball screw nut. At the extension-side end of the third ball screw spindle, a fourth ball screw nut is in turn coupled for conjoint rotation and conjoint displacement, which ball screw nut engages around the fourth ball screw spindle. The fourth ball screw nut is thus movable relative to the housing, but coupled absolutely to the end of the third ball screw spindle.

The fourth ball screw spindle is in turn coupled to a second bearing point for conjoint rotation therewith and for conjoint displacement in the axial direction, the second bearing point being arranged on the side opposite the first bearing point in the axial direction. The rotation movement of the fourth ball screw nut is thus converted into a linear movement of the fourth ball screw spindle. By means of the retraction and extension, the first bearing point and second bearing point are thus moved toward each other or away from each other in the linear direction.

To ensure now that the drive torque is transmitted to the third ball screw spindle, the latter is coupled to a second sleeve for conjoint rotation therewith. The second sleeve is in turn coupled to the drive wheel for conjoint rotation therewith and has a rotationally fixed floating bearing with an axial degree of freedom, such that a rotation movement of the third ball screw spindle is converted, but the third ball screw spindle is mounted axially displaceably relative to the second sleeve and thus extends out of the housing or is retracted into the latter. The second sleeve is mounted concentrically in the first sleeve with respect to the radial direction. In the axial direction, the length of the first sleeve and of the second sleeve is dependent on the respective extension path of the ball screw spindle driven with the sleeve.

In particular, the housing is itself mounted in a rotationally fixed manner. With respect to the axial direction, it is conceivable that the housing is mounted so as to be movable itself in the axial direction and also mounted so as to be fixed in position in the axial direction, such that the first bearing point is moved by the extension-side end of the second ball screw spindle and the second bearing point is moved by the extension-side end of the fourth ball screw spindle with respect to the axially fixed mounting of the housing during execution of the retraction or extension movement.

On account of the favorable friction conditions of the ball screw drives, the latter are also not self-locking at very small pitch angles. In the context of the invention, provision is therefore also made that a brake mechanism affords inhibition against unwanted axial displacement after the desired extension length has been reached.

In the context of the invention, it is moreover possible, for position determination, to carry out an indirect path measurement, for example via a rotation sensor of the drive motor, or alternatively it is also possible to determine the respective extension position by an axial path measurement, for example a cable-pull sensor. For example, a measuring system can be provided in order to determine the total extension path. It is also possible for two partial measuring systems to determine the respective extension of the first pair and of the second pair relative to each other.

In the context of the invention, it is also conceivable for the ball screw drive with the smallest load-bearing capacity to be replaced by a roller screw drive. This relates in particular to the fourth inner ball screw drive.

BRIEF DESCRIPTION OF THE DRAWINGS

For an understanding of embodiments of the disclosure, reference is now made to the following description taken in conjunction with the accompanying drawings, in which.

In the figures, the same or like components are designated by the same reference signs, even if a repeated description of said components is dispensed with for reasons of simplicity.

DETAILED DESCRIPTION OF SOME EMBODIMENTS

Some embodiments will be now described with reference to the Figures.

Figure 1:
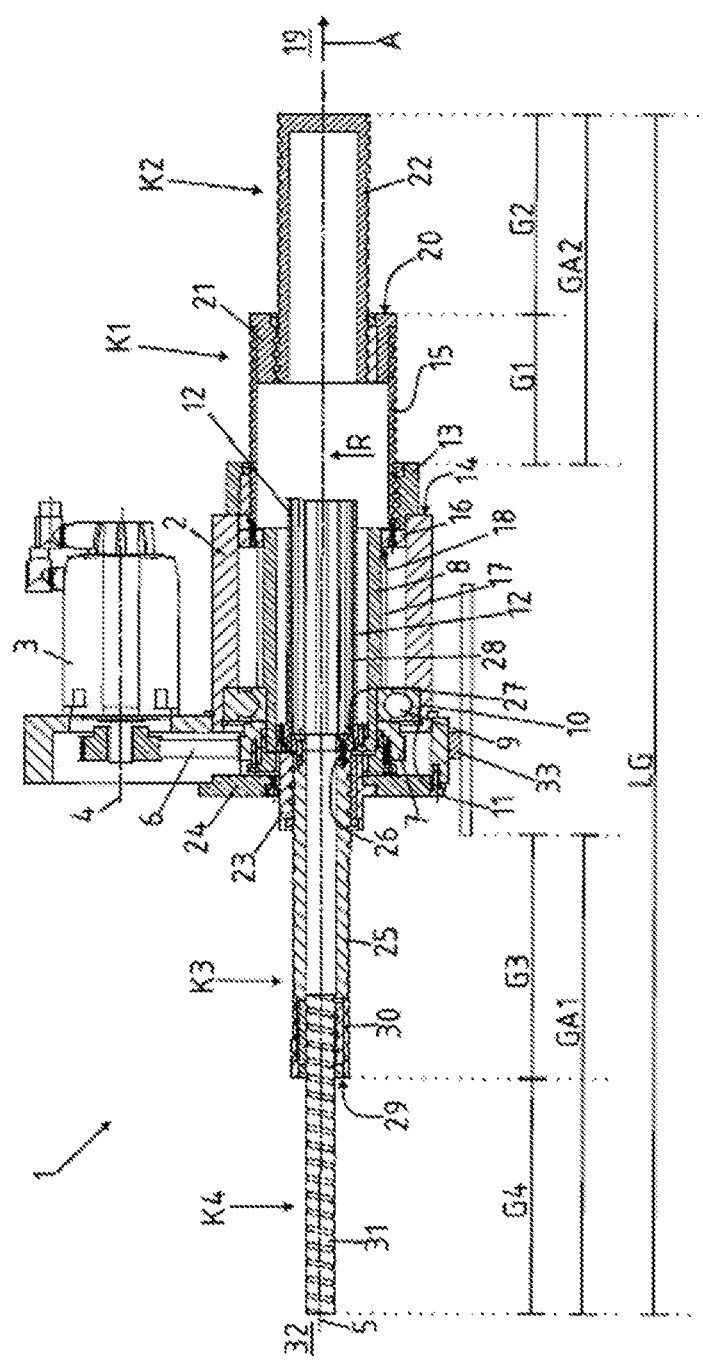
FIG. 1 is a side view of a telescopic actuator in accordance with one exemplary embodiment in the fully extended state; and, FIG. 2 is a side view of the telescopic actuator in the fully retracted state.
Figure 2:
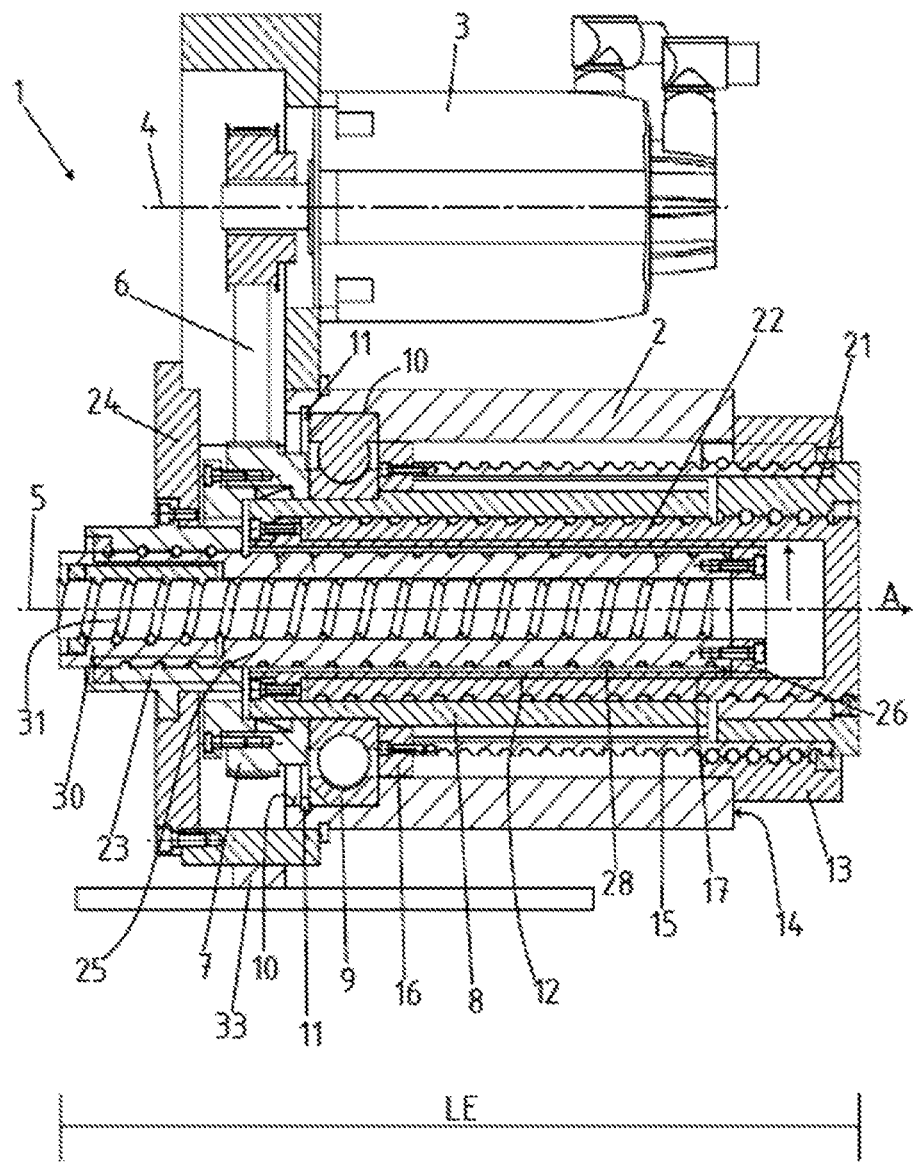

FIGS. 1 and 2 show the telescopic actuator 1 according to the invention in the fully extended state (FIG. 1) and in the fully retracted state (FIG. 2). The telescopic actuator 1 for this purpose has an outer housing 2, wherein a drive in the form of a motor 3 is arranged on the housing 2 in a rotationally fixed manner. For this purpose, the motor 3 itself has a rotation axis 4, which is offset in parallel to a central longitudinal axis 5 of the ball screw drives described below. To ensure that the drive torque of the motor 3 is transmitted to the ball screw drives, it is coupled to a drive wheel 7 via a belt 6. The rotation movement of the rotor 3 is thus transmitted to the drive wheel 7 via the belt 6 and ensures that the drive wheel 7 executes a rotation movement.

It is also possible, although not shown in detail here, that the rotation movement is effected not via a belt but instead via a gearwheel stage or even a direct drive. In the case of the direct drive, the latter would be arranged directly about the housing 2.

The drive wheel 7 itself has a multi-part design, which is dictated in particular by fitting or assembly of the various ball screw drives. The drive wheel 7 is coupled to a first sleeve 8 for conjoint rotation therewith, wherein the first sleeve 8 is in turn mounted rotatably in the housing 2 by a roller bearing 9. In the axial direction A, the roller bearing 9 is for this purpose let into a depression 10 of the housing 2 and secured with a retaining ring 11. Thus, the sleeve 8, but also the drive wheel 7 and the roller bearing 9, is fixed in position in the axial direction A with a degree of freedom of rotation about the central longitudinal axis 5.

Moreover, a second sleeve 12 is arranged concentrically in the first sleeve 8, which second sleeve 12 is likewise coupled to the drive wheel 7 for conjoint rotation therewith. A rotation movement of the drive wheel 7 thus likewise ensures a rotation movement of the second sleeve 12.

To ensure that the rotation movement of the drive wheel 7 is converted into an axial movement in the axial direction A, a first ball screw nut 13 is provided which is coupled to an end 14 of the housing 2 for conjoint rotation therewith and for conjoint displacement in the axial direction A. At its inner end, the first ball screw spindle 15 is coupled with form-fit engagement to a spline hub 16 for conjoint rotation and displacement therewith. If the first sleeve 8 now executes a rotation movement about the central longitudinal axis 5, a continuation 18 oriented inwardly in radial direction R is formed on the spline hub 16 and engages with a form fit in the groove 17 of the first sleeve 8. The rotation movement is transmitted by this form-fit engagement, wherein this is at the same time designed in the axial direction A as a floating bearing, such that a displacement in the axial direction A can be brought about. By means of the rotation movement of the first ball screw nut 13, the first ball screw spindle 15 is thus screwed outward in the axial direction A to a first bearing point 19 in the extension movement from the ball screw nut 13 and, in the reverse rotation movement, is screwed into the housing 2.

At the bearing-side end 20 of the first ball screw spindle 15, a second ball screw nut 21 is mounted for conjoint rotation and displacement. During the rotation movement of the first ball screw spindle 15, the second ball screw nut 21 thus also rotates, wherein the axial displacement of the bearing-side end 20 of the first ball screw spindle 15 also ensures an axial displacement of the second ball screw nut 21.

The second ball screw spindle 22 is connected for conjoint rotation and conjoint displacement at the first bearing point 19. By means of the rotation movement of the second ball screw nut 21, the latter thus screws the second ball screw spindle 22 out of the housing 2 and also out of the first ball screw spindle 15 in the direction of the first bearing point 19 or, in the reverse rotation movement, into the housing 2. This is effected on account of opposite thread turns of the first ball screw drive K1 and second ball screw drive K2. The first bearing point 19 is thus displaced in the axial direction A in relation to the housing 2. It is possible in the context of the invention, although not shown in FIG. 1, to use a measuring system with cable pull which measures, at the first bearing point 19 and fourth ball screw spindle 31, the extension path between bearing point 19 and fourth ball screw spindle 31, in order thereby to measure and indicate the total displacement.

As shown in FIG. 2, the first ball screw drive and the second ball screw drive form the outer second pair, wherein the first ball screw spindle 15 engages around the outside of the first sleeve 8, and the second ball screw spindle 22 is arranged, with respect to the radial direction R, between first sleeve 8 and second sleeve 12.

On the opposite side in the axial direction A, a third ball screw nut 23 is coupled to the housing 2 for conjoint rotation and conjoint displacement therewith, here in particular to a cover 24 of the housing 2. The third ball screw spindle 25 is coupled to a second spline hub 26 for conjoint rotation therewith, which spline hub 26 has outwardly oriented continuations 27, which in turn engage with a form fit in an inner groove 28 of the second sleeve 12 in such a way that a rotation movement about the central longitudinal axis 5 is transmitted and, at the same time, an axial displaceability in the form of a floating bearing is formed. The rotation movement applied by the drive wheel 7 to the second sleeve 12 is thus transmitted to the third ball screw spindle 25, for which reason the latter extends out of the housing 2 in axial direction A in relation to the third ball screw nut 23.

A fourth ball screw nut 30 is arranged at the outer end 29 of the third ball screw spindle 25. The fourth ball screw nut 30 is coupled to the end 29 of the third ball screw spindle 25 for conjoint rotation and displacement therewith. Extension of the end 29 of the third ball screw spindle 25 thus also ensures an axial displacement of the fourth ball screw nut 30.

The fourth ball screw spindle 31 is in turn coupled at a second bearing point 32 for conjoint rotation and displacement therewith, wherein the second bearing point 32 lies opposite the first bearing point 19 with respect to the axial direction A. The rotation movement of the fourth ball screw nut 30 thus ensures a retraction or extension movement of the fourth ball screw spindle 31 in relation to the fourth ball screw nut 30. In this way, the fourth ball screw spindle 31 extends out of the third ball screw spindle 25 and also out of the housing 2. The thread turns of the third ball screw drive K3 and fourth ball screw drive K4 are in opposite directions.

According to the view in the retracted state, the fourth ball screw spindle 31 is mounted in the first ball screw spindle 15 concentrically with respect to the radial direction, and the third ball screw spindle 25 is retracted into the second sleeve 12.

Moreover, a bearing 33 is provided with which the housing 2 can be secured on a base, machine bed or the like, which is not shown in any detail. This bearing 33 is designed in such a way that it secures against rotation relative to the central longitudinal axis 5 of the linear actuator and is either fixed in position in axial direction A or itself mounted so as also to be displaceable in axial direction A. In the former case, it is possible to displace the first bearing point 19 and the second bearing point 32 in the axial direction from an absolute position of the housing 2. If the bearing 33 is itself designed to be axially displaceable, it is possible, with the telescopic actuator 1, for the first bearing point 19 and the second bearing point 32 to be moved relatively toward or away from each other, which would be possible, for example, in a scissor drive of a work platform.

FIG. 1 and FIG. 2 also show the total length LG in the extended state and the total length LE in the retracted state. FIG. 1 also shows the total extension path, which is composed of GA1+GA2, since the telescopic actuator 1 extends on both sides. The extension paths GA1 and GA2 are in turn composed of partial extension paths G1 to G4 of the respective ball screw drives K1, K2, K3, K4.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A telescopic actuator for executing a linear movement, comprising:
   a motor,
   four screw drives,
   a first sleeve,
   a drive wheel, and
   a housing,
   wherein
   the motor is configured to apply a drive torque to the screw drives,
   each of the screw drives comprises a threaded spindle linearly extending and retracting with respect to a screw nut,
   the four screw drives are divided into first and second pairs configured to extend or retract on both sides in an axial direction along an extension path, the extension path comprising four partial extension paths,
   the first sleeve is coupled to the drive wheel for conjoint rotation therewith and is mounted rotatably in the housing,
   the first pair is configured to be retracted into the first sleeve, and
   the first sleeve is coupled to the second pair for conjoint rotation therewith, via a floating bearing with an axial degree of freedom.

2. The telescopic actuator as claimed in claim 1, wherein at least one of the screw drives is a ball screw drive with a ball screw spindle and a ball screw nut.

3. The telescopic actuator as claimed in claim 1, wherein an axial length of the telescopic actuator when fully extended is greater than or equal to 2.5 times the axial length of the telescopic actuator when fully retracted.

4. The telescopic actuator as claimed in claim 1, wherein a division of the extension path during the linear movement is determined by a pitch of each of the screw drives.

5. The telescopic actuator as claimed in claim 1, wherein the first pair is extensible at one side from the telescopic actuator and the second pair is extensible at an opposite side from the telescopic actuator, and a pitch direction of the two screw drives of each pair is oriented in opposite directions.

6. The telescopic actuator as claimed in claim 1, wherein at least one of the screw drives is a roller screw drive with a roller screw spindle and a roller screw nut.

7. The telescopic actuator as claimed in claim 1, wherein a division of the extension path during the linear movement is determined by a pitch direction of each of the screw drives.

8. The telescopic actuator as claimed in claim 1, wherein the first pair is arranged outside the second pair, the first pair has a first screw drive, and a second screw drive arranged inside the first screw drive, and a first screw nut of the first screw drive is coupled to the housing for conjoint rotation therewith and for conjoint displacement in the axial direction.

9. The telescopic actuator as claimed in claim 8, wherein a second screw nut of the second screw drive is coupled to a first threaded spindle of the first screw drive for conjoint rotation therewith and for conjoint displacement in the axial direction, and a second threaded spindle of the second screw drive is coupled to a first bearing point for conjoint rotation therewith and for conjoint displacement in the axial direction.

10. The telescopic actuator as claimed in claim 9 wherein the second pair has a third screw drive, and a fourth screw drive arranged inside the third screw drive, a third screw nut of the third screw drive is coupled to the housing for conjoint rotation therewith and for conjoint displacement in the axial direction.

11. The telescopic actuator as claimed in claim 10, wherein
 a fourth screw nut of the fourth screw drive is coupled to an axial end of a third threaded spindle of the third screw drive for conjoint rotation therewith and for conjoint displacement in the axial direction.

12. The telescopic actuator as claimed in claim 11, wherein
 a fourth threaded spindle of the fourth screw drive is coupled to a second bearing point for conjoint rotation therewith and for conjoint displacement in the axial direction, and
 the second bearing point is arranged opposite the first bearing point in the axial direction.

13. The telescopic actuator as claimed in claim 1, wherein an axial length of the telescopic actuator when fully extended is greater than or equal to 2.8 times the axial length of the telescopic actuator when fully retracted.

14. The telescopic actuator as claimed in claim 1, wherein
 the first pair has a first screw drive and a second screw drive,
 the second pair has a third screw drive and a fourth screw drive,
 a rotation movement of the first sleeve causes a rotation movement of a first threaded spindle of the first screw drive, such that the first threaded spindle is configured to be extended or retracted axially with respect to a first screw nut of the first screw drive, and
 the first threaded spindle is coupled to a second screw nut of the second screw drive, such that a second threaded spindle of the second screw drive is configured to be extended or retracted axially with respect to the first threaded spindle.

15. The telescopic actuator as claimed in claim 14, further comprising:
 a second sleeve which is coupled to the drive wheel for conjoint rotation therewith and is mounted rotatably in the housing,
 wherein
 the first pair is configured to be retracted into the second sleeve, and
 the second sleeve has a floating bearing with an axial degree of freedom and is coupled to a third threaded spindle of the third screw drive for conjoint rotation therewith.

16. The telescopic actuator as claimed in claim 15, wherein
 a rotation movement of the second sleeve causes a rotation movement of the third threaded spindle, such that the third threaded spindle is configured to be extended or retracted in the axial direction and a fourth threaded spindle of the fourth screw drive is configured to be extended or retracted relative to the third threaded spindle.

17. The telescopic actuator as claimed in claim 15, wherein
 the second threaded spindle is arranged between the first sleeve and the second sleeve, with respect to the radial direction, when the telescopic actuator is retracted.

18. The telescopic actuator as claimed in claim 1, wherein
 a measuring system is provided with which a positon determination of the extension path is carried out.

19. A telescopic actuator for executing a linear movement, comprising:
 a motor, and
 four screw drives,
 wherein
 the motor is configured to apply a drive torque to the screw drives,
 each of the screw drives comprises a threaded spindle linearly extending and retracting with respect to a screw nut,
 the four screw drives are divided into first and second pairs configured to extend or retract on both sides in an axial direction along an extension path, the extension path comprising four partial extension paths,
 the first pair is extensible at one side from the telescopic actuator and the second pair is extensible at an opposite side from the telescopic actuator,
 a pitch direction of the two screw drives of each pair is oriented in opposite directions,
 each pair of the screw drives has an inner and an outer threaded spindle, and
 the first pair is arranged lying inside the second pair.

20. The telescopic actuator as claimed in claim 19, wherein
 the drive torque is applied to the first pair and at the same time to the second pair.

* * * * *